UNITED STATES PATENT OFFICE.

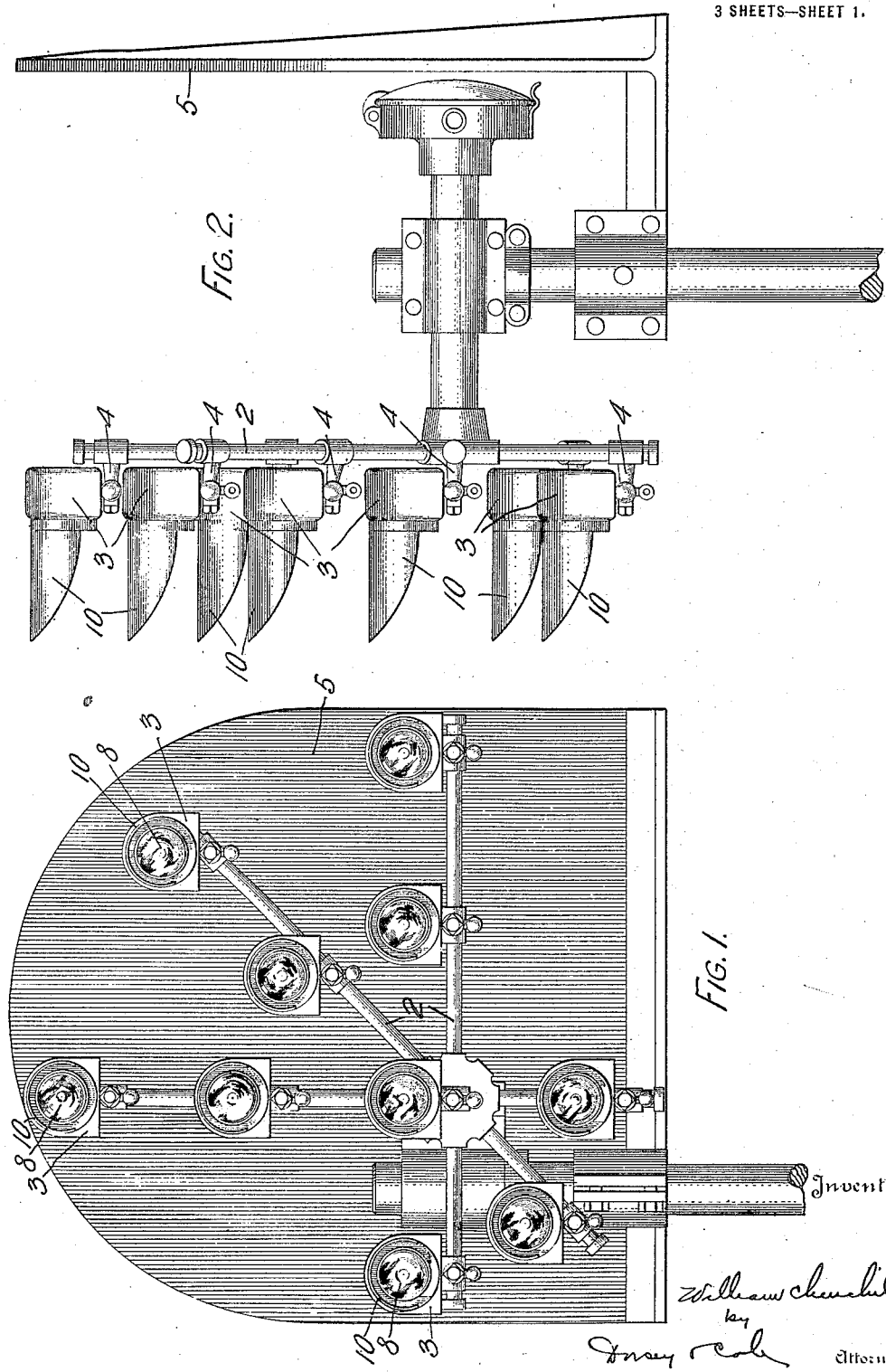

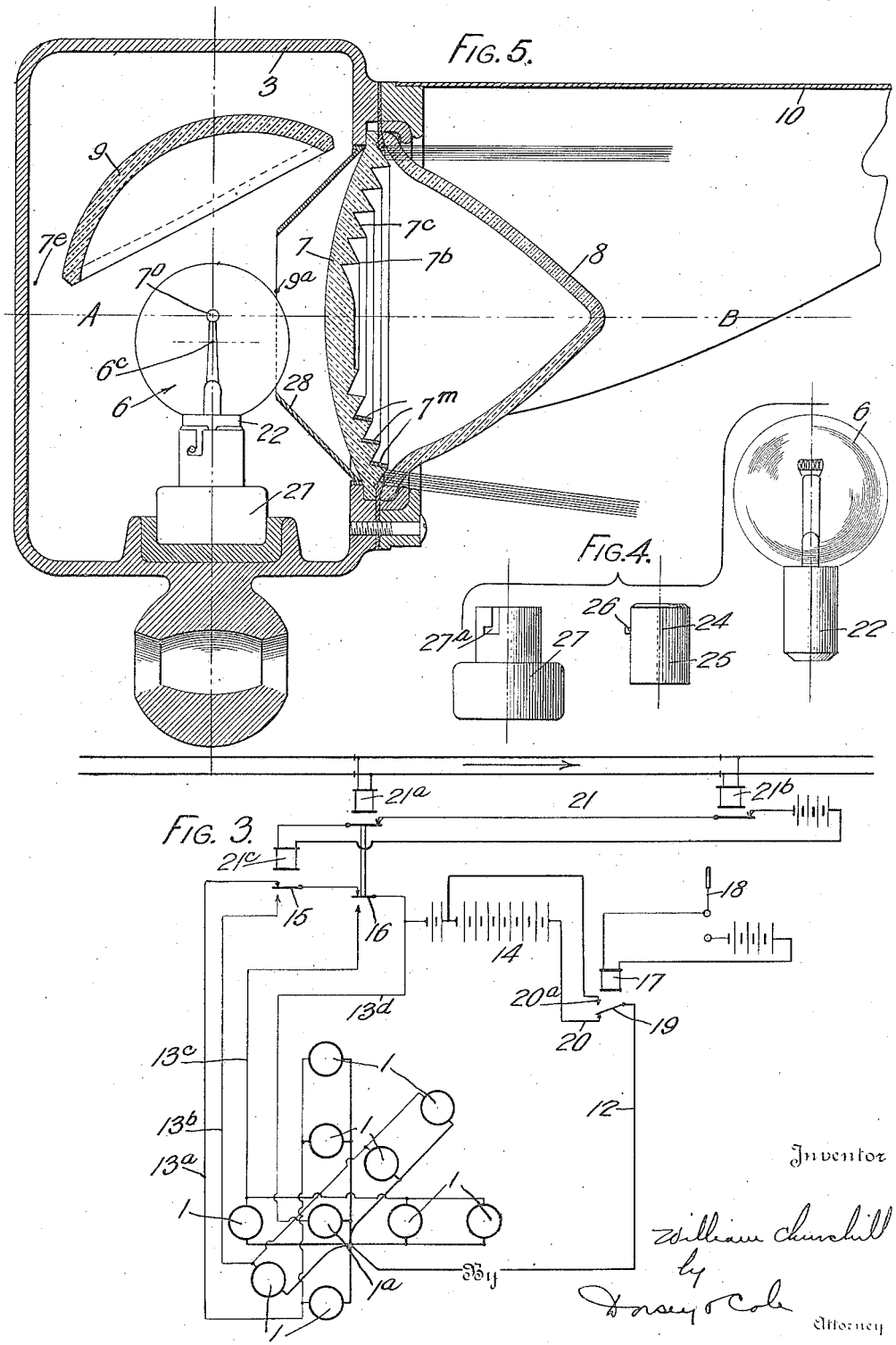

WILLIAM CHURCHILL, OF CORNING, NEW YORK, ASSIGNOR TO CORNING GLASS WORKS, OF CORNING, NEW YORK, A CORPORATION OF NEW YORK.

OPTICAL SYSTEM FOR PROJECTORS.

1,363,566.   Specification of Letters Patent.   Patented Dec. 28, 1920.

Application filed January 22, 1916. Serial No. 73,677.

*To all whom it may concern:*

Be it known that I, WILLIAM CHURCHILL, a citizen of the United States of America, and a resident of Corning, New York, have invented certain new and useful Improvements in Optical Systems for Projectors, of which the following is a specification.

This invention has for its object to provide an improved optical system and means of illumination which, while capable of use in projectors generally, is especially applicable for use in the projecting elements of the so-called "position-light signals." I will, therefore, in the following describe a form of my invention particularly developed for that use, but without limiting its application thereto.

Position light signals differ from the standard semaphore signals in that in lieu of using colored lights by night and semaphone arms by day for transmitting train order, they use lights for both day and night signals. The use of lights during daylight introduces certain difficulties which it is the object of this invention to overcome.

In the use of light signals during a period of atmospheric illumination, it is obvious that a beam of high intensity is demanded if distant reading of the signal is to be had. This results, if economy of operation is to be obtained, in the use of catadioptric projectors with such lights. Such projectors are well known to be exceedingly liable to produce reflections back to the observer, from the elements of the system, of light entering the system from the front. This is the more serious in position light signals in that the signals are for use when the sun is above the horizon, and thus such reflection confuses the observer, and because the means heretofore found sufficient to prevent the giving of such phantom signals by reflection at the cover glasses, mirrors, and other elements of a projecting system from the relatively feeble artificial light sources adjacent to night signals of the prior art are totally insufficient to take care of the greater intensity of the solar rays. This invention therefore provides a special arrangement and construction of parts to prevent such phantom indications, and it consists also in the construction and arrangement of its several parts, and in the combination and assemblages of such parts as will be hereinafter more fully described and claimed.

Referring to the accompanying drawings in which corresponding parts are designated by corresponding marks of reference, Figure 1 is a front elevation of a position light signal structure embodying this invention.

Fig. 2 is a side elevation thereof.

Fig. 3 represents the wiring of signal units such as shown in Figs. 1 and 2.

Fig. 4 is a view showing a lamp and its mounting, the parts being shown separated for purposes of illustration.

Fig. 5 is a vertical section through a light-unit constructed in accordance with this invention, showing the arrangement of the parts thereof.

Figure 6:
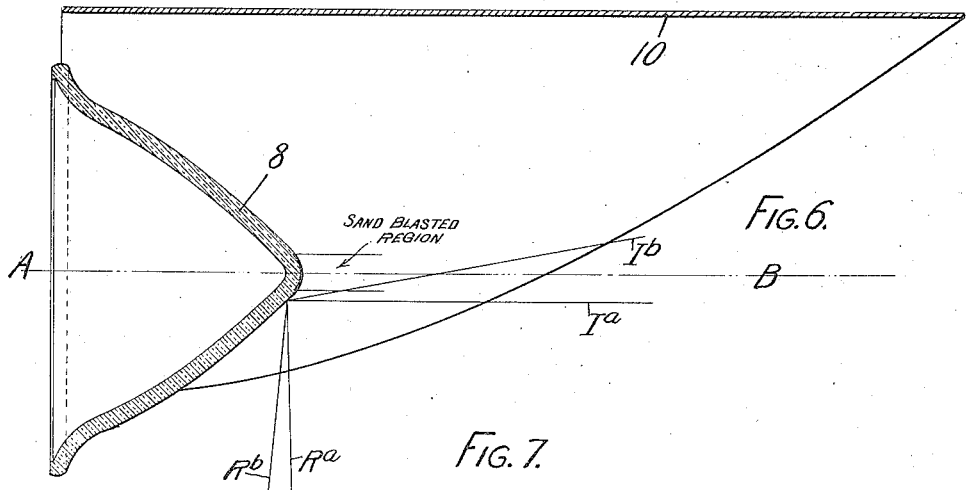
Fig. 6 is a diagrammatic view showing the action of a cover glass and the hood constructed in accordance with this invention in preventing phantom indications.

In the following specification, it will be assumed that the signal embodying my invention is located adjacent to a railroad track, and is a standard signal, *i. e.*, one located above the track and above the eye of the train-crew, and that it is desired that its indications be readable from a definite section of such track in front of the signal, which section will be hereinafter termed the zone of observation. It is, however, obvious that while many of the features herein disclosed are specially applicable to such a location of the signal, my invention in so far as other features are concerned, is not limited thereto.

Particularly describing this invention as applied to position light signals, the light units 1 and 1ª for the signal illustrated are shown in Fig. 1 as arranged in a horizontal row, a vertical row, and a diagonal row, and when the units of any row are illuminated, the indication given corresponds to the signification that may be attached to that row. As shown, all the rows intersect at a common point, which, by preference is not at the end unit of any row, but at a point which is at a unit 1ª, which is intermediate in a row.

The several units are shown as carried from a suitable forked frame 2, which may be of tubing, each unit being contained within its casing 3, which is for universal movement mounted on a stud 4 projecting forwardly from the tubing frame. A screen 5 is erected behind the frame, and by preference is painted black to afford a background against which the indication is seen.

Each unit is shown as consisting of the casing 3 adapted to be mounted on the frame 2, and containing an electric incandescent lamp 6, a lens 7, a cover glass 8, and a mirror 9, and when employed in a standard signal, carrying a hood 10 projecting from the face thereof over and beyond the cover glass 8.

I have in Fig. 3 shown a convenient means for controlling the row of units to be illuminated, and for varying the voltage on the lamps to effect the required variation in illumination desirable to provide for the different conditions attendant upon day and night signaling, the showing here made being adapted for an arrangement of lights having the common unit 1ª. With this arrangement all of the units are connected on their one side to a conductor 12, and all the lamps of each row, except the common lamp, have their opposite sides connected to separate wires 13ª, 13ᵇ and 13ᶜ, respectively, while the common lamp has its other terminal connected to the wire 13ᵈ. The wires 13ª, 13ᵇ and 13ᶜ are connected to one terminal of a variable potential source 14 by means of switches 15 and 16, while the wire 13ᵈ from the common light, may be directly connected to the same terminal of the source. From the source 14 current flows through the common lamp wire 13ᵈ, and the wires 13ª, 13ᵇ, and 13ᶜ, respectively, through the lamps and the common feed wire 12 back to battery, preferably by an alternative circuit to be hereinafter described. The switches 15 and 16 may be either manually controlled by an operator in a signaling-tower, or may be relays, controlled by track circuits or control-circuits which in turn may be controlled by track circuits. In the arrangement shown, the circuit 21 is controlled in series by a track magnet 21ª and a track magnet 21ᵇ, and contains the magnet 21ᶜ of the switch 15. The switch 16 is controlled by the track magnet 21ª. The switches and relays are of standard signal construction, and need no elaboration.

The main lighting circuit, that is to say, the circuit to which the wires 12, 13ª, 13ᵇ, 13ᶜ and 13ᵈ are connected, is, by preference, adapted to be fed by currents of different potentials to provide for the differences in illuminations necessary to day and night signaling, and it is obvious that the lamps of a plurality of signal casings located at different points along the way may be fed from a common source of variable potential, and the potential supplied to the lamps of such signals may be varied simultaneously by a variation in the potential of the source.

This may be conveniently accomplished by providing a relay 17 in a control circuit 18 adapted to actuate a switch 19 connected with the common feed 12, and to throw it to the one or the other of two contact points 20, 20ª, one of which is connected to the opposite pole of the battery 14, from the pole to which the wires 13ª, 13ᶜ and 13ᵈ are connected, and the other of which is connected to an intermediate point at that battery. The switch 19 may obviously be handled by a control-circuit 18 which may extend through a considerable length of road, or may be local to each signal station and be controlled in any desired way, when it is desired to shift the voltage.

It is obvious, however, that in lieu of using a battery any convenient variable source or sources may be employed and that the light-wiring for each signal may be connected with a line extending along the right of way, and upon which variable voltage may be impressed at will.

The use of a common lamp is an advantage, in that such lamp may be kept constantly burning, and need not be extinguished or lighted on each change of the signaling, providing an additional light unit in any row of lights that may be used. This is an advantage in reducing the amount of current to be controlled by the circuit-controlling relays which are necessarily of delicate construction, and liable to be damaged upon the passage of excessive current.

To meet the requirement of long range signal indication without undue consumption of energy and increase of the size of the parts, it is necessary that the lamp filament be concentrated as much as possible in the principal focal point of the lens, which should be of such a character as to concentrate the light falling thereon from the source into a beam, whose dispersion should be as closely as possible that necessary to cover the desired zone of observation. Such a beam, however, cannot provide for a close indication, (i. e., an indication to one immediately beneath or above it) and therefore I employ a reflector so located that it forms from the rays from the lamp falling thereon an image of the same at a point nearer the lens than the actual source, and somewhat above or below the axis of the lens.

In this connection it may be noted that the use of a reflector located as usual behind the lens and designed to throw back the light falling thereon around the principal axis of the lens, is prohibited by the fact that such reflection would equally serve to reflect light falling on the front face of the lens and passing therethrough.

The lens which I have found most suitable is of the inverted Fresnel type and for the protection of the zones thereon, I provide the cover glass.

Inasmuch as railroad tracks are in general practice, substantially level or an inclination therefrom of only a few degrees, and as the desired zone of observation is one extending along said track at the elevation of a few feet thereabove, each signaling unit will be arranged to cover such a zone. This means that the principal optical axis of the lens will be substantially parallel with the track, although it may, (according to its elevation) be slightly convergent therewith or divergent therefrom, or in other words it will be substantially horizontal, (and in the following discussion this will be presumed), and it may thus, under certain facing of the signal, be directed toward the rising or setting sun, which would, unless provision is made therefor, cause confused indications by reflection, or refraction and reflection, from the elements of the unit.

Having thus stated the general construction of my improved signal, I will discuss in detail the problems presented by the several parts of a unit and my solution thereof.

I have discovered that when the sun shines directly on a combination such as that herein shown, reflections of lights are liable to occur which may be mistaken for signal indications, unless the design of the respective parts of the signal is such as to obviate this difficulty. While in practice the hood 10 by projecting from the front of the casing above the cover glass, protects the unit from all direct illumination by the sun, except when the latter is near the horizon in rising or setting, it is impossible, in certain situations to lower the end of the hood, if used, sufficiently to afford absolute protection when the sun is approximately 20° or less above the horizon. When the sun is very close to the horizon, its light is so diminished by atmospheric absorption that no appreciable glare is produced, and according to observation, the real angle of danger lies between 5° and 20° above the horizontal. I find that glare, within the danger range indicated, may be suppressed by a proper arrangement, construction and relation of the parts which will be now discussed.

*The cover glass,* (Fig. 6.)

Both the anterior and posterior surfaces of a convex cover glass are capable of acting as convex and concave mirrors, respectively, and although dispersing the rays of a beam impinging upon them, can, under suitable conditions, reflect a portion of the light toward the zone of observation, unless the shape of the cover glass is so designed as to deflect all rays, even under the most adverse conditions, at such angles as will render them harmless.

For a standard signal, I prefer to make the cover glass in the form of a hollow conoid, the angle formed by opposite sides being approximately ninety degrees, with the apex of the cover-glass in the principal axis A—B of the lens, such apex being sandblasted or etched. This produces a matted surface at a point where, for manufacturing reasons, the curvature of the surface is such that objectionable reflections might otherwise be produced. The lower limit of the matted surface should be such as to include the lower part of the curve at the apex, so that the reflections of horizontal rays from the lower unmatted conical surface will be behind the observation zone, as represented by the incident and refracted rays $I^a$ and $R^a$, respectively. Rays falling on the lower face of the cover glass from above the horizontal, will obviously be reflected farther to the rear, as shown at $I^b$ and $R^b$.

The hood 10 should, if circumstances permit, project sufficiently over and around the upper face of the cover glass to protect it from rays which are so nearly vertical that they would fall on the cover glass from such direction as to be reflected by the latter forwardly toward the zone of observation.

Figure 7:
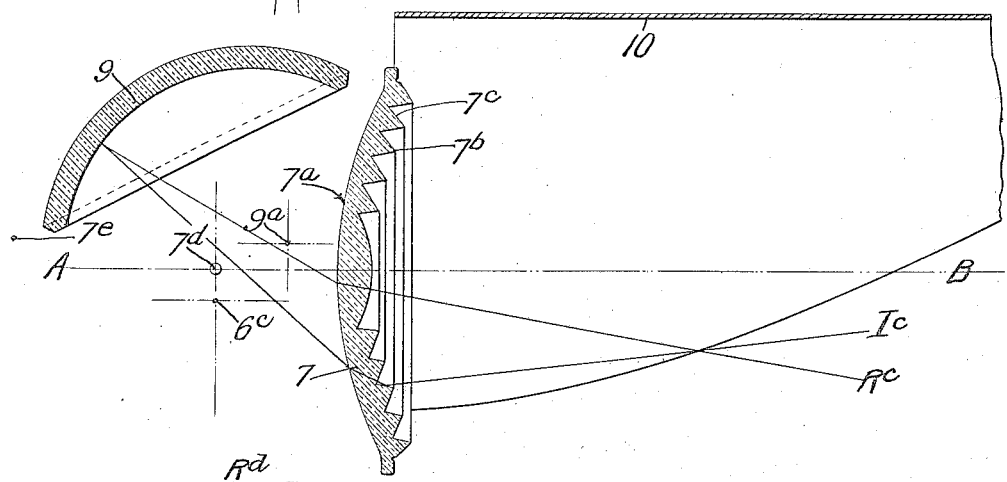
Fig. 7 is a diagrammatic view showing the action of the lens and mirror constructed and assembled in accordance with this invention in preventing phantom indications.

*The lens,* (Fig. 7.)

The lens preferably used, is as stated, of the inverted Fresnel or corrugated type, that is to say, it has on its outer face, a central convex portion $7^a$, surrounded by a series of zones $7^b$ formed by miters $7^c$. I find it especially desirable to use a lens of this type in which the refracting faces are so formed that the beam projected thereby is not symmetrical with the axis of the lens but is spread laterally in respect to the principal axis A—B thereof, to provide for inaccuracy of side alinement and for curved tracks, and vertically downward for a standard signal, or upwardly for a "dwarf" signal, while restricted in its upward divergence for standard signals, and in its downward divergence for dwarf signals.

In the preferred construction for a standard signal, this is accomplished by giving less refractive power to the lower portion and side portions of the lens than to the upper portion thereof. This may be accomplished by giving to the refracting faces on the lower and side portions of the lens a greater radius of curvature than is given to the corresponding faces on the upper portion of the lens, as is described in a pending application of Churchill and Pascucci. This results in a downward projection of the refracted beam in respect to the principal pal axis of the lens, as is shown in Fig. 5 to prevent waste of power by rays projected over the desired points of observation, and to throw the same downwardly upon the track.

Figure 8:
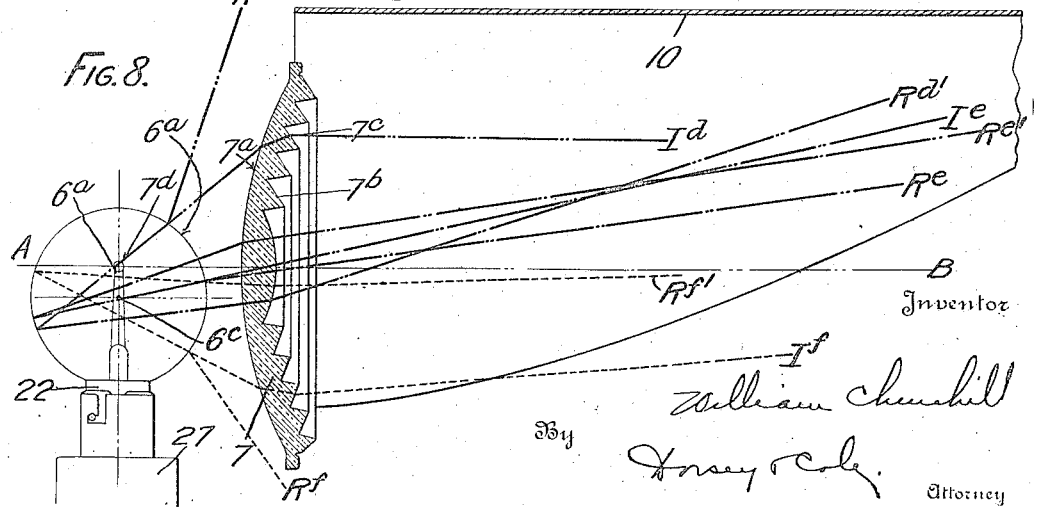
Fig. 8 is a diagrammatic view showing the action of lens and lamp bulb constructed and assembled in accordance with this invention in preventing phantom indications.

In the drawings, and particularly Figs. 7 and 8, I have indicated the upper portion of the lens as approximately focusing for axial parallel rays at a point $7^d$ on the principal axis A—B, and the lower portions of the lens as approximately focusing for the same rays at $7^e$, in the rear thereof and above the principal axis.

In the use here, particularly contemplated, i. e., for giving daylight signals, this has the advantage that parallel rays falling on the lower portion of the anterior face of the lens instead of coming to the focus at the light source, focus at a point behind the same. This is of importance in its bearing on the position in which it is possible to locate the mirror 9, and allows the latter to be dropped farther down without producing reflection therefrom, than would otherwise be the case. The faces of the lens are, moreover, designed with so great a curvature as to disperse the rays to an extent sufficient to render any considerable reflection impossible.

Under certain conditions, it is possible that light, as shown by the incident beam $I^c$ in Fig. 7, may fall on the upper face of a miter on the lower portion of the lens from such direction as to be reflected therefrom in such a manner that after refraction in the lens and reflection from the mirror, it is thrown back through the lens and refracted thereby and projected in the direction $R^c$, toward and to the zone of observation. This may be avoided by blackening the surface of the miters on such portions of the lens as are liable to produce this result, as is shown at $7^m$ in Fig. 5. This obviously would not be feasible if such blackening should cut down the transmission of the light from the light source in passing through the lens. For this reason, the miters should be so formed that they are substantially parallel to the path of rays from the light source passing through the lens where such miters are located, a lens of this character being shown in U. S. Letters Patent #1,033,780, of July 30, 1912.

*The mirror*, (Fig. 7.)

As stated, this is used to produce a close indication. Its general position is that shown in the patent to Churchill, #1,092,560, that is to say, the center of curvature of the reflector is above the principal axis of the lens and in front of the source. When the mirror is so disposed, the reflected rays focus about a point $9^a$ somewhat forward of the source and above the principal axis of the lens. By locating the real image so produced at such point, the divergent beam produced by the rays reflected from the mirror and refracted by the lens is directed downwardly on the track immediately in front of the signal. The lower rear edge of the mirror is, in the present arrangement, sufficiently above the principal axis of the lens A—B to prevent any substantial portion of the rays which may pass under the hood and fall on the lower part on the anterior face of the lens striking the same after refraction in the lens. No forward reflection by the mirror will occur of rays incident on the upper part of the lens, as such rays are refracted downwardly.

*The light source*, (Fig. 8.)

As before stated, it is preferable to use an incandescent electric lamp as the light source and to further use such lamp with a concentrated filament $6^a$, the axis of which, in order to aid in horizontal dispersion, should be horizontal and at right angles to the principal axis of the lens. This filament should, as stated, be located in the principal axis A—B of the lens, and at the principal focal point $7^d$ of the part thereof which is to give the long range indication. When an asymmetrical lens of the construction described is used in a standard signal, this portion of the lens is the upper portion, and with such a lens this places the source in front of the focal point of the lower part of the lens.

Inasmuch as for a proper vertical divergence a close adjustment of the lamp vertically is necessary, I prefer to mount lamps on vertically adjustable mountings, such for instance as those shown in Fig. 4.

In this figure, the lamp has upon its base the metallic cap 22, adapted to enter a sleeve 25, in which sleeve the lamp may be adjusted vertically by sliding it up and down until a given distance is obtained between the filament of the lamp and pins 26 projecting from the outside of the sleeve, in which position the parts are soldered. The sleeve thus forms a supplemental cap for the lamp. Such sleeve may be then inserted in the base 27 provided with the bayonet slot $27^a$, by which the lamp will be positioned, and which will firmly clamp the sleeve upon the lamp collar. This provides a convenient means for overcoming irregularities of elevation in the sealing in of the filaments.

The use of an electric lamp as a light source introduces, unless proper provision is made therefor, certain reflections tending to produce phantom signals, for the surfaces of a glass bulb, such as used to inclose an electric lamp filament act as mirrors, reflecting a certain percentage (approximately 10 per cent.) of all light impinging thereon. It has been found that this reflex illumination of a unit may be prevented by so shaping and locating the bulb in respect to the other parts of the optical system that the bulb in combination with the lens and mirror cannot project light entering the system along and to the zone of observation. A bulb of spherical or approximately spherical shape located with its center of curvature below the principal axis of the lens meets these conditions. With the location of the filament of the lamp in the principal axis of the lens, this places the filament above the center of curvature of the bulb.

The outer and inner surfaces of the front wall of a bulb act as convex mirrors, and similarly, the outer and inner surfaces of the back wall of the bulb act as concave mirrors. Therefore, in accordance with well known optical laws governing reflection, the surfaces of the front wall of a spherical bulb produce a virtual image, and the surfaces of the rear wall produce a real image, the location of the two images being approximately the same. If the images formed by reflection of the bulb have their real or virtual location sufficiently below the principal axis of the lens, rays forming such images will not be projected forwardly of such lens to the zone of observation. In the construction here shown, I so proportion and arrange the parts of the optical system that this relation between the real and virtual images and the principal axis is obtained as completely as possible, with the lens shown herein.

Referring to Fig. 8, it will be noted that the ray $I^d$, axially incident on the upper and main portions of the anterior face of the lens, after refraction in the lens, strikes the front wall of the bulb from such direction as to be partly reflected in the direction $R^d$. Such part of such ray as passes through the front wall strikes the rear wall of the bulb, and is reflected therefrom in such direction that after refraction in the lens, it proceeds in the direction $R^{d1}$. The reflected ray $R^{d1}$, before refraction in the lens, and the prolongation of the ray $R^d$ into the bulb, intersects at a point below the principal axis of the lens. Therefore rays forming an image at and apparently issuing from such point are projected upwardly in respect to the principal axis of the lens, and do not fall on the zone of observation. This is also true of other rays falling on the upper and main portion of the lens within limits permitted by the hood, as is illustrated by the incident ray $I^e$, and the refracted rays $R^e$ and $R^{e\prime}$ thereof.

The same is generally true of incident rays falling on the lower wide angle portion of the lens, although such portion may introduce certain complexities and render a complete elimination of reflex action from the bulb impossible. Thus the incident $I^f$, Fig. 8, is either reflected from the front wall of the bulb in such a direction $R^f$ as to not fall upon the lens, or is reflected by the rear wall of the bulb in such direction as after refraction to proceed in the direction $R^{f\prime}$, that is, upwardly and at an angle in respect to the principal axis. With certain combinations, however, it is possible that an incident ray falling upon the lower part of the lower zone substantially parallel with the axis of the lens, or from slightly above such axis may, after refraction and reflection, be thrown forwardly substantially parallel with such axis. Inasmuch, however, as the sun at the time this is possible has very little power, and as only a small part of the lens face is capable of producing this result, the reflex action is negligible, and the presence of such reflection is permissible both in practice, and as falling within the scope of this invention.

I have further found that the tip commonly present in the bulbs of electric lamps as the result of the process of sealing subsequent to exhaustion may be a source of reflection in a structure such as here shown, and thus I prefer to use tipless lamps.

If desired, a diaphragm 28, represented in Fig. 5, may be placed within the casing to intercept certain possible reflections of incident rays.

Obviously, the interior of the casing should be blackened, and this can advantageously be done to all surfaces therein save those whose duty is to either transmit, reflect or refract light from the source. The hood should, if possible, have its forward end at such an elevation above the principal axis of the lens, and projecting forwardly sufficiently to intercept light rays falling on the cover glass at such an angle as to enter the combination from directions causing detrimental reflections.

I further prefer to use yellow glass of the character known to the trade as "Noglare," as the material for the cover glass. As is well known, this glass cuts down the blue and violet rays from the light source, and its use is markedly advantageous in rendering the position indications more distinct, by preventing the loss of direction of the rows of light source, and this without materially reducing the visible intensity of the signaling lights in the day time.

It will be noted that in the construction shown, the more or less condensed beam for the long distance indication is given by the upper portion of the lens, a more divergent beam for the medium distance indication given by the lower and side portions of the lens, and that a still more divergent beam for the close indication is given by the mirror and the lower portion of the lens, the last beam being the more dispersed (as is desirable) due to the fact that it has its source in the image produced by the mirror.

not only in front of the focal points of such lens, but also in front of the source of illumination.

In practice, it has been found that with semaphore lenses having an aperture of five inches, with a source of illumination behind each lens formed by a four-candle power, 12-volt lamp, having a filament in the form of a single helix one quarter of an inch long, and three-eighths of an inch in diameter fed by current at eleven volts, and with five of such units arranged in a row at eighteen inches apart from center to center, daylight indications readable at a distance of four thousand feet are obtained, while the same parts are suitable for night-signaling when the voltage is reduced to six.

The reason for the reduction of candle power at night is that with the more powerful illumination necessary for day-light signaling, the light-emissive source may, under certain conditions, merge into one circular body of illumination when viewed from a distance at night, while if reduced to the figures last given, the field of illumination appears as an elongated bar.

It is to be understood that the above figures are given not as a limitation on the scope of this invention, but as an illustration of one embodiment thereof, and that while I have, as before stated, described a relative location of parts in respect to the principal axis of the lens suitable for a standard signal to be observed from below it is obvious that when used in a dwarf signal (i. e., to be observed from above), the position of the different portions of the lens, and of the mirror in respect to the principal axis should be inverted.

It will be understood that, in so far as certain aspects of this invention is involved, the character of the independent units is immaterial, and that each unit may be regarded broadly as a light-emissive source or point, however the illumination of that point be produced.

Having thus described my invention, what I claim is:—

1. In a system for signaling by light signals, a cover glass having a convex anterior face and having a matted surface on such portion of such face as would otherwise cause reflex indication by rays falling thereon.

2. In a system for signaling by light signals, a cover glass in the form of a hollow conoid having a matted surface restricted to the apex of the conoid to prevent reflection therefrom of rays incident thereon.

3. The combination of a lens and a cover glass therefor, the cover glass having a convex anterior face provided with a matted surface for a limited distance around the principal axis of the lens.

4. The combination with a lens, of a cover glass therefor, the cover glass being in the form of a hollow conoid whose apex is approximately in the principal axis of the lens and has a matted surface restricted to such apex.

5. In a signaling system, the combination with a light source, of a lens projecting the light therefrom toward a zone of observation and a convex cover glass whose curvature is such that light falling on the lower anterior surface parallel with the principal axis of the lens and from above such axis will be reflected downwardly beyond the closer limit of such zone.

6. In a signaling system, the combination with a light source, of a lens projecting the light therefrom toward a zone of observation, and a cover glass whose curvature is such that light falling on its lower anterior surface parallel with the principal axis of the lens or from above such axis will be reflected downwardly beyond the closer limit of such zone, the cover glass having a matted surface for a limited distance around the principal axis.

7. In a signaling system, the combination with a light source, of a lens projecting the light therefrom toward a zone of observation, a cover glass having a convex anterior surface, and a hood projecting forwardly over the cover glass and intercepting the light from above which would otherwise be reflected by the cover glass toward the zone of observation.

8. In a signaling system, the combination with an asymmetrical lens having different sectors of different refractive power, of a source of light located at the approximate principal focal point of one sector to produce a long range indication, and in front of the approximate principal focal point of another sector to produce a medium range indication by a more dispersed beam, and a mirror forming an actual image of the source to the front thereof, and to one side of the principal axis of the lens, in a position to have the rays forming the image refracted by the last-named sector of the lens to produce a divergent and dispersed beam for close indication.

9. A lens having refracting zones upon its forward face united by miters, such miters being rendered non-reflecting at certain points to prevent reflections of light incident thereon.

10. A lens having a stepped front face consisting of walls united by miters, the miters being located substantially parallel to the path of the rays passing through the lens where such miters are located, and the miters being rendered non-reflecting at points to prevent the reflection of light falling thereon.

11. In an optical system, the combination with a reflector located behind a lamp, of a lens having a stepped front face consisting of zones united by miters, the miters being rendered non-reflective of light falling thereon from the front of the lens.

12. In a signaling system, the combination with a source of light, of a lens for condensing the light therefrom, and a mirror for forming an image of the source in front of and above the source, the lower edge of the mirror being above the principal axis of the lens.

13. In a signaling system, the combination with a lens for condensing the light therefrom, of a source of light, and a mirror for forming an image of the source in front of and above the source, the lower rear edge of the mirror being above the path of axial rays incident on the anterior face of the lens after the same has been refracted thereby.

14. In a signaling system, the combination with a lens, and a source of light, of a mirror located to one side of the source and having its center of curvature forward and to one side of the source for forming an image of the source forward and to one side of the source, the mirror being to the same side of the path of rays parallel with the axis of the lens after refraction thereby as is the center of curvature of the mirror.

15. In a signaling system, the combination with an asymmetrical lens, a sector of which has a greater focal length than another sector thereof, of a source of light located at the approximate principal focal point of the sector of shorter focal length, a mirror located behind such sector and to one side of the source, the mirror being so situated as not to be in the path of axial horizontal rays incident on the anterior face of the lens after refraction thereby.

16. In a signaling system, the combination with an asymmetrical lens having different sectors of different refractive powers, of an incandescent electric lamp, the axis of which is vertical and at substantially right angles to the principal axis of the lens, and whose filament is in the form of a long narrow horizontal coil, whose axis is at right angles to the axis of the lamp, and to the principal axis of the lens, and means for locating the lamp axially so that the filament intersects the principal axis of the lens at the principal focal point of one of the sectors thereof.

17. In a signaling system, the combination with a lens whose principal axis is substantially horizontal, of an incandescent electric lamp, the axis of which is substantially vertical, and at substantially right angles to the principal axis of the lens, and whose filament is in the form of a long narrow horizontal coil, whose axis is at right angles to the principal axis of the lamp, and to the principal axis of the lens, and means for adjusting the lamp axially so that the filament intersects the principal axis of the lens at the principal focal point thereof.

18. In a signaling system, the combination with an asymmetrical lens, having a sector of less refractive power than another of its sectors, of a lamp comprising a light source, and an inclosure therefor, the source being located at the approximately principal focal point of the sector of greater refractive power, and the center of curvature of the inclosure being situated on the same side of such point as is the sector of less refractive power.

19. In a signaling system, the combination with an asymmetrical lens, having its lower part less refractive than its upper part, of a lamp comprising a light source, and an inclosure therefor, the source being located approximately at the principal focal point of the upper part of the lens, and the center of curvature of the inclosure being below such point, the principal focal point of the lower part of the lens being in the rear of the inclosure.

20. In a signaling system, the combination with an asymmetrical lens having its lower part less refractive than its upper part, of a lamp comprising a light source, and an inclosure therefor, the source being located approximately at the focal point of the upper part of the lens, and the center of curvature of the inclosure being below such point, the principal focal point of the lower part of the lens being in the rear of the center of curvature of the bulb.

In testimony whereof I have hereunto signed my name.

WILLIAM CHURCHILL.